US007620720B1

(12) United States Patent
Gasser

(10) Patent No.: US 7,620,720 B1
(45) Date of Patent: Nov. 17, 2009

(54) METHODS AND APPARATUS FOR DEALLOCATION OF RESOURCES

(75) Inventor: Morrie Gasser, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1044 days.

(21) Appl. No.: 11/001,489

(22) Filed: Dec. 1, 2004

Related U.S. Application Data

(63) Continuation-in-part of application No. 10/750,336, filed on Dec. 31, 2003, now Pat. No. 7,401,137.

(51) Int. Cl.
*G06F 15/173* (2006.01)
*G06F 15/177* (2006.01)
(52) U.S. Cl. .................. 709/226; 709/221; 715/735
(58) Field of Classification Search ................ 709/223, 709/226, 221; 715/733–739
See application file for complete search history.

(56) References Cited

U.S. PATENT DOCUMENTS 6,901,446 B2 * 5/2005 Chellis et al. ............... 709/226

| 7,191,329 B2 * | 3/2007 | Murphy | 713/100 |
| 2003/0093509 A1 * | 5/2003 | Li et al. | 709/223 |

* cited by examiner

Primary Examiner—David Lazaro
(74) Attorney, Agent, or Firm—Chapin IP Law, LLC

(57) ABSTRACT

Initially, a processing device receives a selection of one or more resources to be deallocated from a storage area network. The processing device applies a traversal function to a repository of managed objects representing the resources in the storage area network to identify other resources (e.g., resources related to the selected one or more resources) in the storage area network that at least partially rely on existence of the selected one or more resources for accessing data stored in the storage area network. The processing device graphically presents the selected one or more resources for deallocation in relation to identified other related resources by highlighting the related resources in the storage area network environment that would not be inherently deleted altogether but whose ability to access data would at least be partially impaired if the selected one or more resources were deallocated from the storage area network environment.

37 Claims, 10 Drawing Sheets

METHODS AND APPARATUS FOR DEALLOCATION OF RESOURCES

RELATED APPLICATION

This application is a Continuation-In-Part (CIP) of earlier filed U.S. patent application Ser. No. 10/750,336 now U.S. Pat. No. 7,401,137 entitled "METHODS AND APPARATUS FOR APPLICATION OF MANAGEMENT ACTIONS TO RESOURCES SHARING RELATIONSHIPS," filed on Dec. 31, 2003, the entire teachings of which are incorporated herein by this reference.

BACKGROUND

The rapid expansion of information service and data processing industries has resulted in a need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to these types of data storage requirements by integrating high capacity data storage systems, data communications devices (e.g., switches), and computer systems (e.g., host computers or servers) into networks called "storage networks" or "Storage Area Networks" (SANs.)

In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer accesses a large repository of storage through the switching fabric on behalf of the requesting client. Thus, a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network. Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and deallocate resources (e.g., hardware and software resources) in a storage area network. Consequently, the network manager can reconfigure a SAN.

The infrastructure required to support access to data in a storage area network can be quite complex. As an example, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system then transmits the I/O requests through a host interface device resource, such as an interface card ((e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array. After the requested data is accessed via the storage devices, I/O responses are returned to the user application along an information or data flow path that includes operations and processing functionality provided by each of the aforementioned components and resources in a reverse direction back to the application on the host computer running the client application. In this way, access to data in a conventional storage area network involves reliance on a proper operation and coordination of a multitude of software and hardware resources in a SAN.

SUMMARY

Conventional network management applications that support management of network resources in a SAN suffer from a variety of deficiencies. For example, deallocating resources from a SAN can be quite a complex process because deallocation of a particular resource can impact a chain of other resources in the SAN unbeknownst to the user deleting the particular resource. For example, in a SAN environment including many host computers and storage arrays, logical objects on a host computer (e.g., host objects) can include one or more storage devices on storage arrays to which the host is connected through a SAN. Host objects may consist of file systems, databases, logical volumes and volume groups of a logical volume manager, multipath devices, and host devices. Each host device typically maps to one or more storage devices. It is useful for a user to be informed of what other host objects (other than the specific resource being deleted or deallocated) would be affected as a result of executing a deallocation action on a selected set of storage devices. Thus, when a user attempts to deallocate a resource in the SAN, a user can be informed of other related resources in the chain of resources in the SAN that will be inherently deallocated as a result of deallocating the selected resource as well as other related resources that will be only partially affected by deallocating the selected resource. For example, if a network administrator deallocates an interface card from the SAN and fails to be informed that a particular host resource such as a software application still requires access to data stored within a storage device through the interface card selected for deallocation, the software application relying on use of the interface card will likely experience execution problems due to the inability of the software application to access the data using the deallocated interface card.

Embodiments of the invention significantly overcome the aforementioned and other deficiencies of conventional network management applications. In particular, embodiments of the invention include a method to identify and display which resources in a SAN will be impacted by execution of a management action such as deallocation of resources in the SAN.

For example, one embodiment of the invention includes a technique of utilizing a processing device (or processing code, etc.) to facilitate deallocation of resources in a storage area network environment. Initially, the processing device receives a selection of one or more resources to be deallocated from the storage area network environment. The processing device then applies a traversal function to a repository of managed objects representing the resources in the storage area network environment to identify other resources (e.g., resources related to the selected one or more resources) in the storage area network environment that at least partially rely on existence of the selected one or more resources for accessing data stored in the storage area network environment. Prior to deallocating the selected one or more resources from the storage area network environment, the processing device graphically presents the selected at least one resource in relation to the identified other related resources to illustrate i) respective managed objects that will be partially deallocated and ii) respective managed objects that will be completely deallocated as a result of deallocating the selected one or more resources. Based on this technique, a network manager can utilize a graphical user interface generated by the processing device to identify how deallocation of a particular selected resource in a SAN will impact other related resources not being specifically deallocated. For example, in one embodiment, the processing device graphically presents the selected one or more resources for deallocation in relation to identified other related resources by highlighting the related resources in the storage area network environment that would not be inherently deleted altogether but whose ability to access data would at least be partially impaired if the selected at least one resource were deallocated from the storage area network environment.

As an example, a SAN manager may elect to delete a first storage device in the SAN. A single logical volume may be the only resource that uses the first storage device to store data in the SAN. In this instance, the network manager may decide to deallocate the storage device. Such an action would result in inherent deallocation of the logical volume as well.

According to another scenario, a SAN manager may elect to deallocate a second storage device in the SAN. In this latter case, however, a logical volume may use this second storage device as well as other storage devices in the SAN to access data. In other words, the logical volume does not rely solely on the second storage device to store data in the SAN. Deallocation of only the second storage device would impact this logical volume but would not cause the logical volume to be deallocated completely or inherently because the second storage device makes up only a portion of the logical volume. As discussed, embodiments of the invention include highlighting these affected resources in a SAN so that a network manager can make an informed decision whether to proceed with a deallocation request.

Accordingly, a graphical user interface of the present application can provide 3 things about an object such as i) that an object will be fully deallocated, ii) that an object will be partially deallocated (and hence will be corrupted), and iii) that an object will lose some of its paths but not all of them (and will suffer reliability or performance when accessed) if a user confirms deallocation of the selected set of resources. It may be useful to note that case (i) is actually a special circumstance of case (iii) in which an object loses *all* its paths. In other words, an object that loses all its paths is considered fully deallocated.

Techniques described herein are well suited for use in applications in which a network manager manages allocation and deallocation of resources in a SAN environment. However, it should be noted that techniques herein are not limited to use in such applications and thus embodiments of the invention are well suited for other applications as well.

Other embodiments herein include a computerized device (e.g., a host computer, workstation, etc.) configured to support the aforementioned method operations. In such embodiments, the computerized device includes a display, a memory system, a processor (e.g., a processing device), and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform any of the method embodiments and operations explained herein.

Yet other techniques of the present application include software programs to perform the method embodiment and operations summarized above and disclosed in detail below under the heading Detailed Description section of this application. More particularly, a computer program product (e.g., a computer-readable medium) including computer program logic encoded thereon may be executed on a computerized device to facilitate deallocation of resources in a storage area network as explained herein. The computer program logic, when executed on at least one processor with a computing system, causes the processor to perform the operations (e.g., the methods) indicated herein. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

Another embodiment herein is directed to a computer program product that includes a computer readable medium having instructions stored thereon for facilitating execution of management commands. The instructions, when carried out by a processor of a respective computer device, cause the processor to perform the steps of: i) receiving a selected at least one resource to be deallocated from the storage area network environment; ii) applying a traversal function to a repository of managed objects representing the resources in the storage area network environment to identify other resources in the storage area network environment that at least partially rely on existence of the selected at least one resource for accessing data stored in the storage area network environment; and iii) prior to deallocating the selected at least one resource from the storage area network environment, graphically presenting the selected at least one resource in relation to the identified other resources to illustrate a) respective managed objects that will be partially deallocated and b) respective managed objects that will be completely deallocated as a result of deallocating the selected at least one resource. It should be understood that the system herein can be embodied as a software program or as a software program operating in conjunction with corresponding hardware. Example embodiments herein also may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the techniques herein will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles, and concepts.

DETAILED DESCRIPTION

Figure 1:
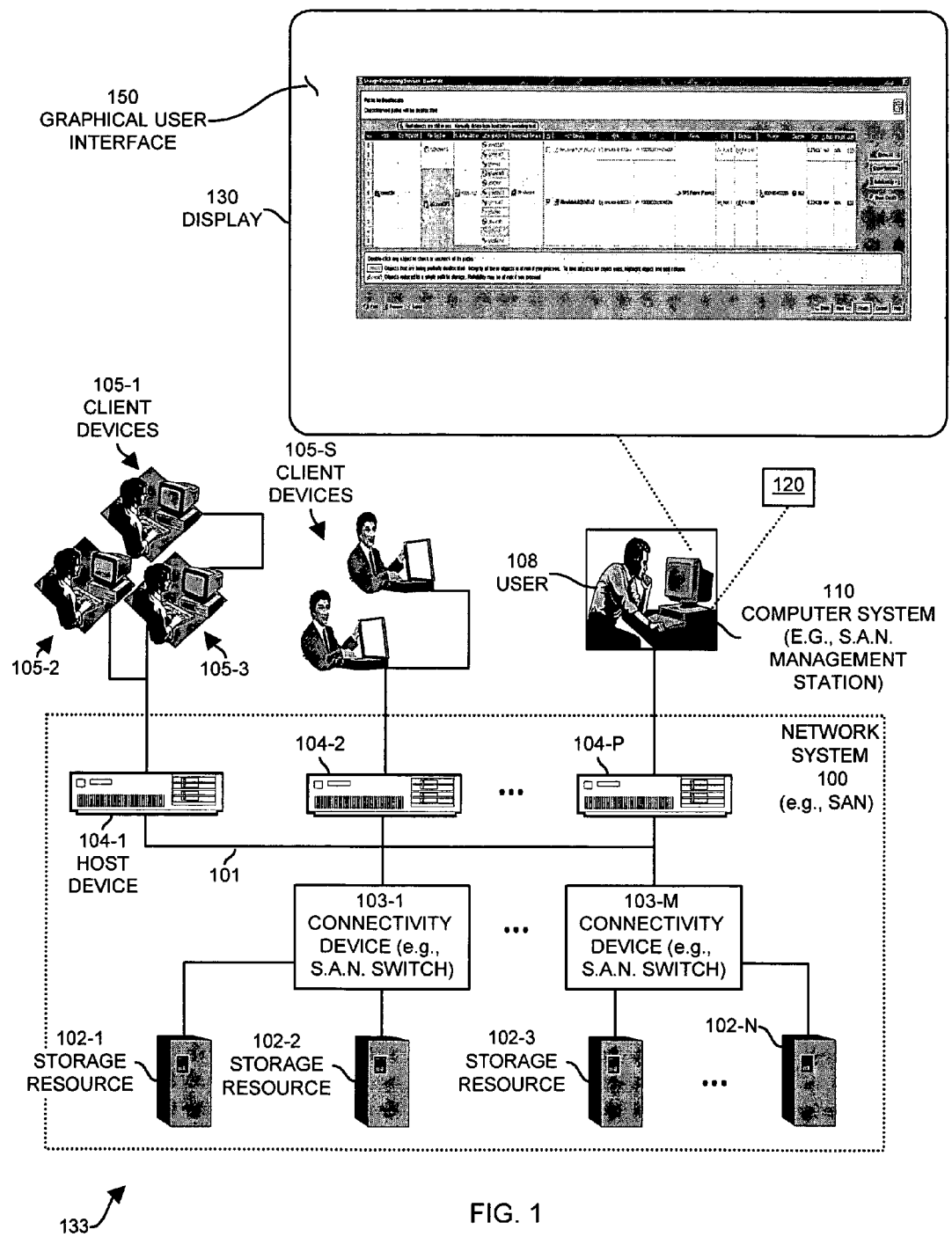
FIG. 1 is a block diagram of a storage area network and management station configured to facilitate viewing of a relationship of resources in the storage area network.

In a storage area network environment, resources or objects in a host computer system (e.g., host objects or host resources) typically have a predefined relationship with respect to one or more storage device resources on the storage arrays to which the host computer system is connected through the storage area network. For example, logical resources such as file systems, databases, logical volumes and volume groups of a logical volume manager, multipath devices, and host interface devices, etc. in the storage area network typically map to storage devices (e.g., disk drives) in the storage arrays of the storage area network for storage of data. Management actions or commands applied to a selected set of host resources can affect operation of the other resources (e.g., those resources not explicitly being deleted) in unexpected ways without first knowing how those host resources are mapped via relationships to their corresponding storage device resources. For example, application of management operations or actions (e.g., commands) on a host resource, such as deallocation of storage space (e.g., removing storage space assigned to a file system or database or volume group), disabling paths, establishing zoning, changing protection levels associated with that host resource and so forth may affect operation of those and possibly other host or even non-host resources in sometimes unpredictable manners. In conventional management applications, an administrator performs or applies such management actions by selecting a graphical set of objects that represent the resources and applying a corresponding management action to those selected objects or resources.

In one example case, assume that a host resource such as a volume or file system is fully represented by a selected set of storage devices to be deallocated. For example, assume that host resource does not use any storage device resources other than the ones to which the action is to be applied. In this case, the actions on the storage device resources are in effect actions on the host resource itself because deallocation of a resource does not only partially impact another resource in the storage area network. In other words, if a network manager deallocates a storage device in the storage area network used only by the volume or file system (assuming also that the volume or file system uses only the storage device and no others), deallocation of the storage device results in "complete" deallocation of the corresponding volume or file system.

In another example case, assume that a host resource is only partially represented by the set of storage device resources to which an action is to be applied. For example, assume that logical volume uses both a storage device that has been selected to be deallocated and another storage device that has not selected to be deallocated from the storage area network. In this case, deallocation of only one storage device used by the logical volume rather than both storage devices results in an incomplete action on the host resource (e.g., the logical volume), possibly corrupting that host resource. In this latter case, the administrator may want to insure that the action on the affected host resource is "complete" (i.e., like the first case above) before applying a deallocation command. To this end, techniques herein enable a user to view other storage device resource that the host resource "uses" (i.e., that share an operational or functional relationship with the host resource, either directly or indirectly via other resources), but which are not part of the originally selected set of resources. The user is thus able to preview a relationship topology prior to carrying out the action on those other storage device resources as well. Accordingly, a network manager may prevent accidentally deallocating a resource that, if deleted, would impair other resources in a storage area network environment that were not originally intended to be affected by deallocation of the resource.

FIG. 1 illustrates a network system 100 (e.g., a storage area network) suitable for explaining an operation of example embodiments herein. As shown, the network system 100 includes a network medium 101 such as a high-speed data communications medium (e.g., Ethernet, optical network, or other type of network) that interconnects a plurality of components such as storage resources 102-1, 102-2, . . . , 102-N, network switches 103-1, . . . , 103-M, collectively connectivity devices 103 (e.g., SAN switches), host devices (e.g., host servers) 104-1, 104-2, . . . , 104-P, client devices 105-1, 105-2, . . . , 105-S, and computer system 110 (e.g., a storage area network management station). Computer system includes resource manager 120 such as a software application that supports generation of graphical user interface 150.

In the example shown, computer system 110 is configured as a storage area network management station operated by network manager or user 108 (e.g., a user responsible for managing resources associated with storage area network 100). Computer system 110 executes a resource manager application 120 (e.g., a software graphical user interface application more particularly shown in FIG. 2) that generates and displays information in accordance with embodiments explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) that resource manager 120 controls to display a graphical user interface 150 as explained herein. In general, user 108 provides input commands to control what information (e.g., tables, pop-up screens, etc.) is displayed on display 130. For example, a user first makes a selection of one or more resources for potential deallocation from network system 100. In response to the selection, computer 110 generates a graphical user interface 150 including a display of the selected one or more resources as well as other related resources in the network system 100.

The resource manager 120 generally operates as explained herein to receive a management action or command from the user 108 (e.g., via a graphical user interface action on the display 130), which is to be applied to a user selection of resource representations, presented by a management application as graphical icons on the display 130 of the management station computer system 110. After receiving a selection of resources by the user 108, the resource manager 120 identifies operational relationships between the selected resources and other resources within the storage area network 100 that may be affected by the application of the management action to the selected resource.

As a brief example, suppose the user 108, using the resource management application 120 graphically selects a representation of a file system resource associated with one of the host devices 104. Further suppose that the user 108 decides to apply a management action such as deallocation to a selected file system resource in order to deallocate storage space from the file system. According to techniques herein, the resource manager 120 identifies other resources that are operationally related to the file system resource to which the management action (e.g., deallocation) is to be applied. These other resources may be, for example, a logical volume resource, a host device resource, one or more storage device resources (operating within one or more of the storage systems 102), and so forth. Once identified, the resource manager 120 graphically presents this collective set of "action-affected resources" to the user 108 to inform the user 108 of a set of resources within the storage area network environment that will be affected by the deallocation action if it is to be applied to the selected file system. Based on this information, the user 108 is able to make an informed decision if a given deallocation action will be properly carried out as intended so as not to adversely affect the integrity of other resources that will be impacted by the deallocation action.

Figure 2:
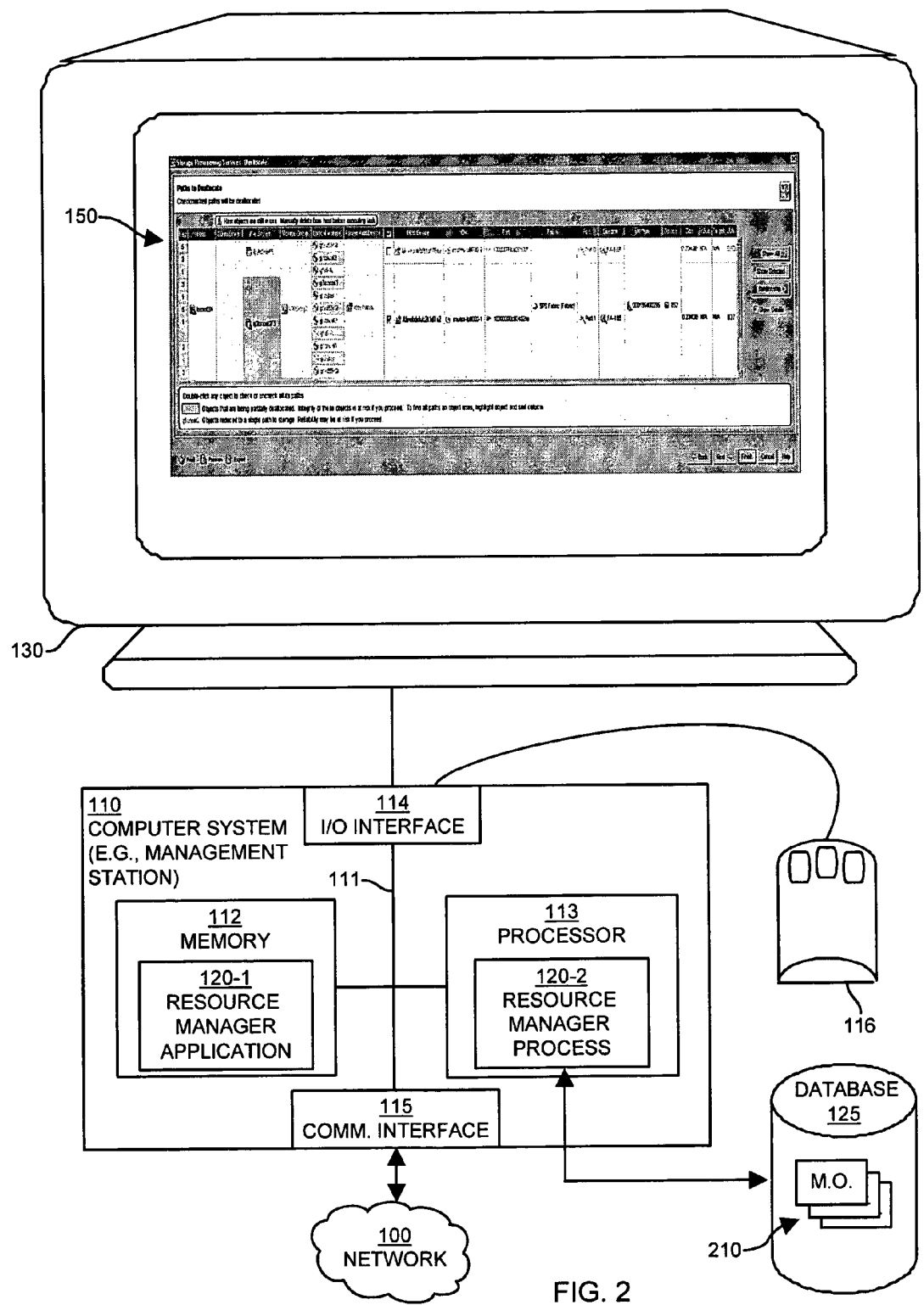
FIG. 2 is a block diagram of an example processing device suited for providing a graphical user interface to facilitate viewing a relationship of resources in a storage area network.

FIG. 2 is a block diagram illustrating an example architecture of computer system 110 (e.g., a storage area network management station). Computer system 110 may be a digital processing device such as a personal computer, workstation, portable computing device, console, laptop, network terminal or the like. As shown, computer system 110 of the present example includes an interconnect 111 that couples a memory system 112, a processor 113, an input/output interface 114, and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software resource entities associated with host devices 104, storage resources 102, etc.) in network system 100. Communications interface 115 enables computer system 110 (and corresponding user 108) to communicate with other devices (i.e., resources) associated with network 100.

As shown, memory system 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of this discussion, general reference will be made to the resource manager 120 as performing or supporting the various steps and functional operations to carry out techniques discussed herein.

It should also be noted that example configurations herein include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory system 112 such as in firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 110. For example, the resource manager 120 can be executed on a remotely accessible computerized device. In this instance, the graphical user interface 150 may be displayed locally to the user 108, while the resource manager process 120 is executed remotely.

To generate displayed information in graphical user interface 150, the host computer system 110 (e.g., the resource manager process 120-2) extracts information from database 125. For example, in one embodiment, the resource manager 120 receives an identity of at least one selected network resource associated with the storage area network environment 133. Based on the selected network resource, the resource manager 120 extracts information associated with the managed objects 210 associated with the selected network resource as well as other related managed objects 210 or resources related to the selected network resource from management database 125.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources associated with network system 100 or storage area network environment 133 in general. More details regarding use of managed objects 210 and corresponding resource in storage area network environment 133 will be discussed in connection with FIG. 3.

Figure 3:
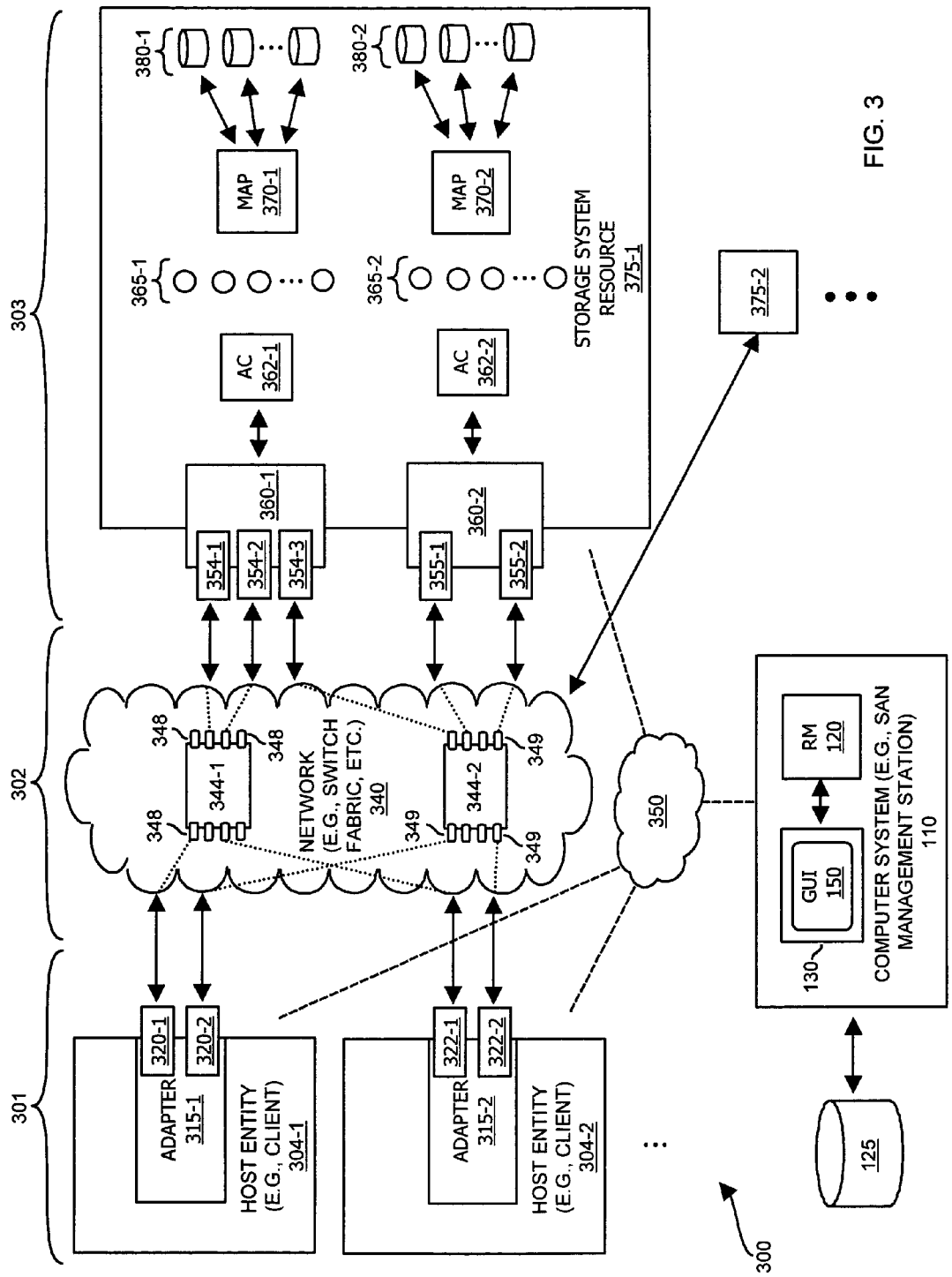
FIG. 3 is a block diagram illustrating a relationship between host resources, switch resources, and storage resources as well as a corresponding network management station facilitating viewing resources allocated for use in a storage area network.

FIG. 3 is a block diagram more particularly illustrating connectivity of network resources (e.g., host resources 301, switch resources 302, and storage resources 303) in a storage area network environment 300. As shown, storage area network environment 300 includes host entity 304-1 and host entity 304-2 (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 125. Network 340 includes switch device 344-1, switch device 344-2, and corresponding switch ports 348 and 349. Host entity 304-1 includes adapter 315-1 and corresponding port 320-1 and port 320-2 to communicate (e.g., via a fiber link) over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enables host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone set defines a group of resources in the network providing a logical path between a host resource and a storage array resource. As will be discussed in more detail, the resource manager 120 enables selection of a resource in the storage area network environment 300 and traverses a database 125 of managed objects to identify an interrelationship of the selected resources and other resources in the storage area network environment 300. This is discussed in more detail in the following text and related figures.

Figure 4:
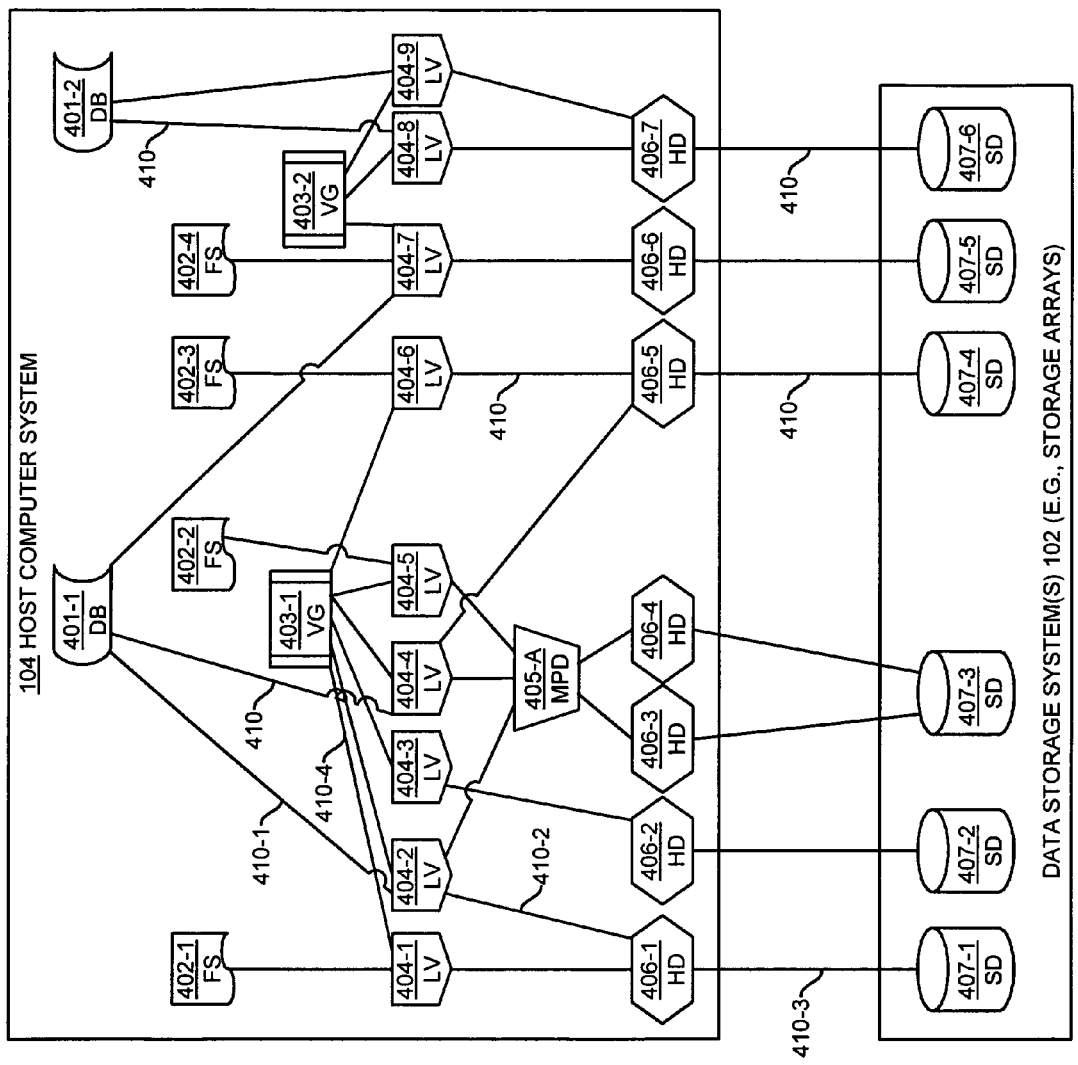
FIG. 4 is an example of a hierarchy of resources associated with a storage area network environment.

FIG. 4 is a hierarchy illustrating details of resource interrelationships for i) a set of example host resources 401, 402, 403, 404, 405, and 406 in a host computer system 104 and ii) storage resources 407 within an example data storage system 102 of storage area network environment 133. As shown in this example, the resources 401 through 407 include database resources 401, file system resources 402, volume group resources 403, logical volume resources 404, multipath device resources 405, host interface device resources 406, and storage device resources 407. The relationship paths, lines or indicators 410 extending between the various resources 401 through 407 indicate specific operational, functional or "in use" relationships between the various resources. Such relationships 410 indicate, for example, that one resource is "used by" or depends upon the operation of another resource.

As an example, the relationship indicator 410-1 extending between the database resource 401-1 and logical volume resource 404-2 indicates that the logical volume resource 404-2 configured within the host computer system 104 is "in use by" the database resource 401-1. Likewise, the relationship indicator 410-2 indicates that the host interface device resource 406-1 is in use by the logical volume resource 404-2. Continuing this example, the relationship indicator 410-3 that extends out of the host computer system 104 across the storage area network 100 (e.g., through one of the switches 103 as in FIG. 1) and joins storage device resource 407-1 (which may be, for example, a disk drive or logical portion thereof in the data storage system 102) and indicates that the storage device resource 407-1 is in use by the host device resource 406-1.

The resource indicators 410 in FIG. 4 may further illustrate data flow, relationship paths, or information flows between resources within the storage area network 100. As discussed in the above example, the continuous path of resource indicators 410-1 through 410-3 represent data flow, or information flow, or in use paths from the database resource 401-1 to the storage device resource 407-1. Data flow path 410-1 through 410-3 indicates that a portion of the data associated with the database resource 401 (e.g., a database instance available for access to client computer systems 105 from the host computer system 104) is stored in the storage device resource 407-1 (i.e., is stored within a disk drive represented by this storage device resource). Note that only a portion of the data from the database resource 401-1 is stored within the storage device resource 407-1 because other relationship paths extend from the database resource 401-1 to other logical volume resources 404 which, in turn, have other relationship indicators 410 extending to other resources that continue on down to different data storage device resources 407.

Figure 5:
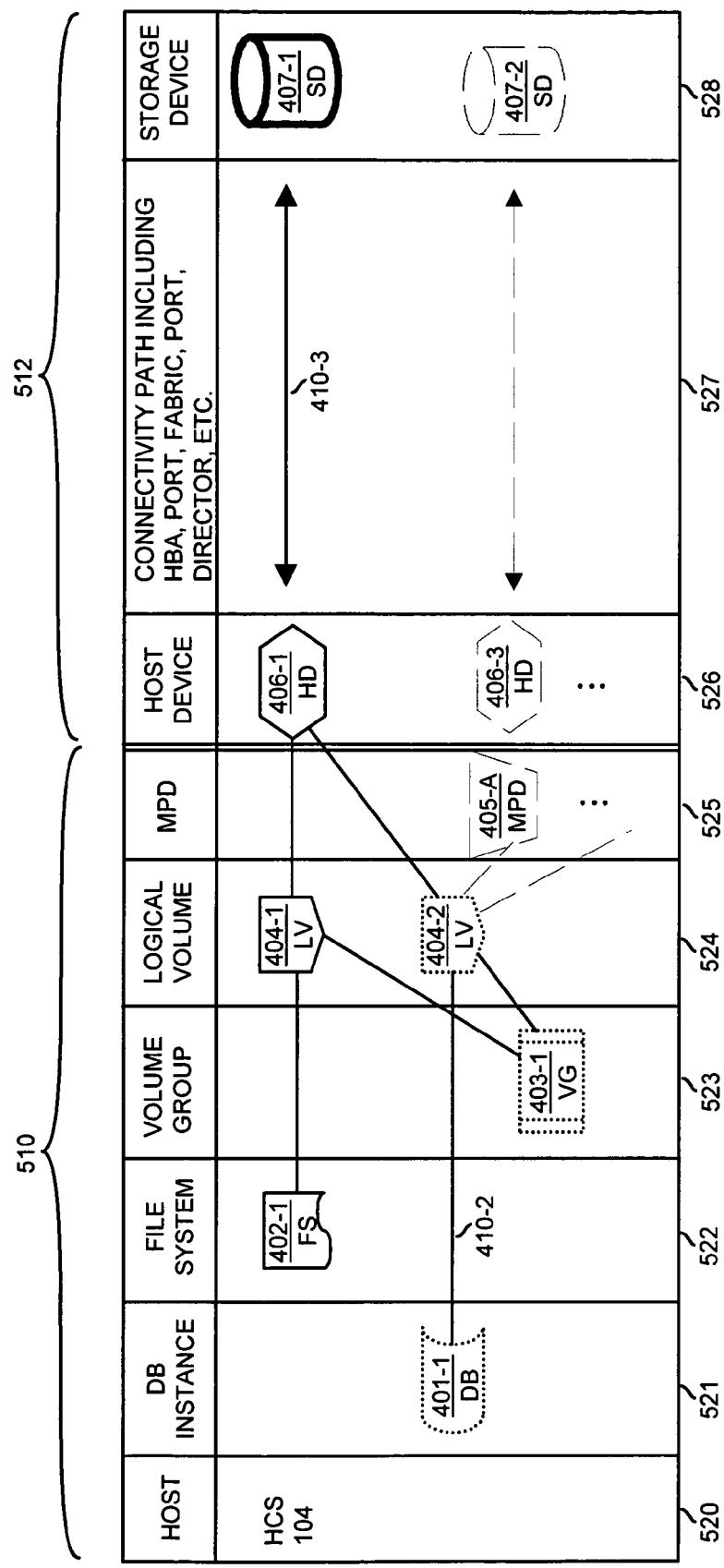
FIG. 5 is a diagram illustrating a hierarchy of resources and an interrelation of resources in the hierarchy associated with a storage area network.
Figure 6:
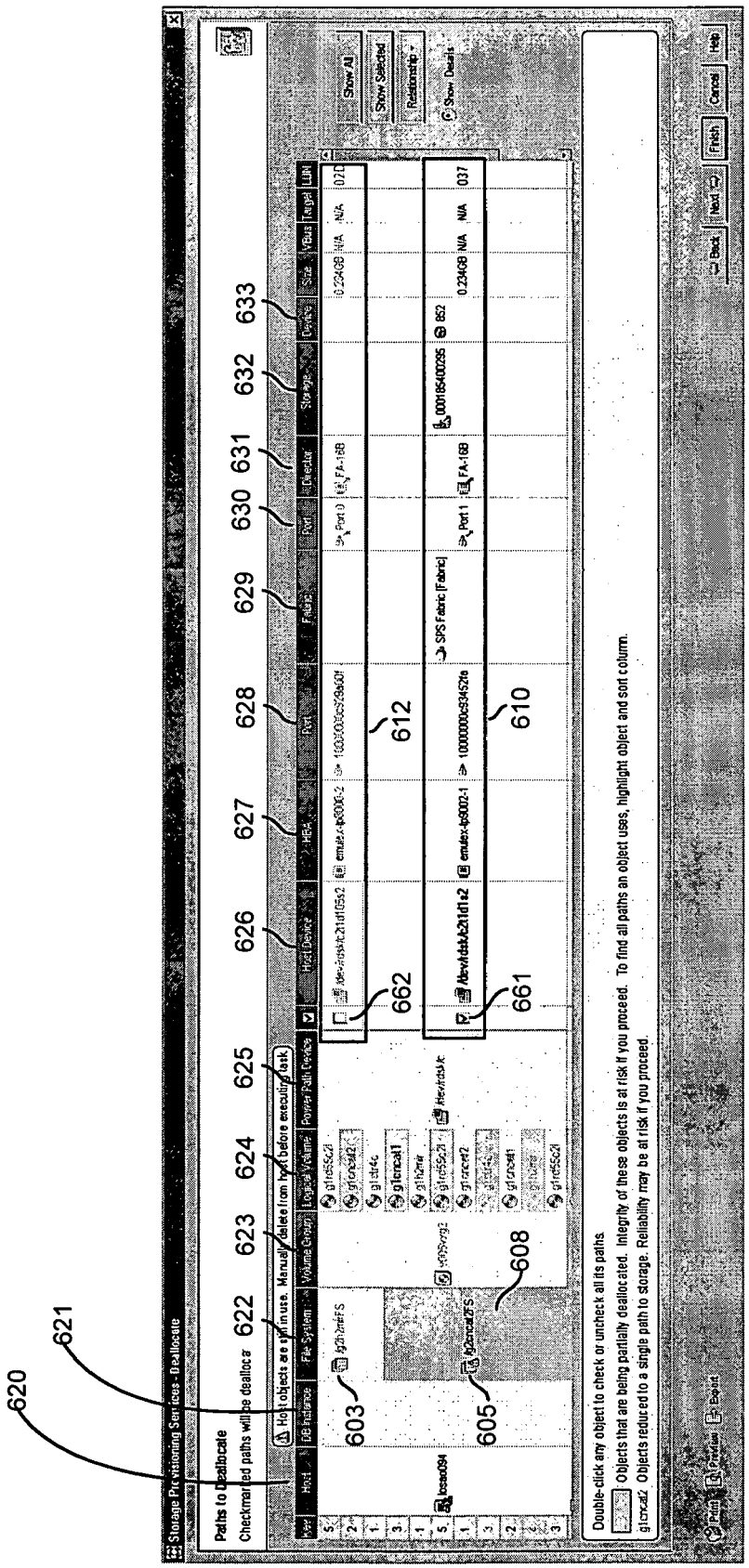
FIG. 6 is a screenshot of a graphical user interface facilitating allocation/deallocation of resources associated with a storage area network.

Certain techniques herein are based in part on the observation that a management action applied to a particular resource 401 through 407 within a network environment such as the storage area network 100 can have an impact or affect on other resources due to the operational relationships existing between the various resources. For example, using the deallocation example from above, suppose a user 108 selects a graphical representation of the file system resource 402-1 in graphical user interface 150 and decides to deallocate some or all of the storage space associated with this file system resource 402-1. Techniques herein employ a processor traversal function to follow the relationship indicators 410 from the selected file system resource 402-1 down to the logical volume resource 404-1 and further down to the host interface device resource 406-1 and then to the lowest level storage device resource 407-1. In other words, the processor function follows a path through levels of a hierarchy of resources as in FIG. 4 to identify a relationship of a selected resource with other resources. Based on this information, the processor function identifies how deallocation of storage space in the file system 402-1 has an impact on the resources 404-1, 406-1 and 407-1 within the network environment 100. FIGS. 5 and 6 illustrate display of the relationships.

Referring again to FIG. 4, note that the volume group resource 403-1 has a relationship indicator 410-4 extending to the logical volume resource 404-1. This indicates that the logical volume resource 404-1 is also "in use" by the volume group resource 403-1. Accordingly, the deallocation operation applied to storage space associated with the file system resource 402-1 (in the above example) can potentially have an impact on the proper operation of the volume group resource 403-1 since this volume group 403-1 "uses" (i.e., includes data stored on storage space associated with) the logical volume 404-1 which is also, as explained above, "used by" the file system resource 402-1 from which space is to be deallocated. Accordingly, due to the complex series of interrelationships between the resources illustrated in FIG. 4, application of a management action to any particular resource 401 through 407 as selected by the user 108 may have potential adverse operational impact on other resources.

Embodiments herein operate to allow the user 108 to identify those other resources 401 through 407 that might be impacted by application of a particular management action or command to a particular selected resource 401 through 407 or group of selected resources. To perform such operation, processor functionality is capable of traversing relationships between resources as indicated in FIG. 4 by the resource indicators 410 to discover or identify operational, functional, dependency, inherency, or other types of interrelationships between resources within, for example, the host computer system 104 and the data storage system 102 in order to notify the user of those other impacted resources that may be affected upon application of a management action to the selected resource(s) 401 through 407 chosen by the user for that action.

To traverse the resource indicators 410, computer 110 applies a series of resource traversal functions that can navigate up and down a resource hierarchy along the relationship indicator paths 410 in the repository 125 that contains managed objects 210 that represent the collective set of resources operating within a respective storage area network. In particular, managed objects 210 represent respective resources 401 through 407 in the network environment. The managed objects 210 in the repository 125 are hierarchically related as identified by indicators 410. The hierarchy order includes host objects representing host resources 401 through 406 and storage objects representing storage resources 407 that are allocated for storing data accessed by the host resources. The host objects (i.e. resources 401 through 406 in a host computer system 104) are hierarchically related above the storage objects 407 (the lowest objects) in the hierarchically arranged order.

In one application, the hierarchy or order of resources includes top-level resources that include database 401, file system 402 and volume group resources 403 (e.g., top level objects in the repository 125 or resources in the actual storage area network 100), followed by the next lower level of logical volume resources 404, which are then followed further down in the hierarchy by multipath device resources 405, below which are host interface device resources 406 which are then followed downward by the lowest level storage device resources 407. Hierarchically arranged host objects thus include a top-level host computer system (i.e., the computer itself and all its resources), a database 401, a file system 402, a volume group 403, a logical volume 404, a multipath device 405, a host interface device such as a host interface card or port. Hierarchically arranged storage objects include the lowest-level storage devices 407 such as disk drives that store data. Other resources not shown in these examples can include, for example, a storage adapter, storage ports, software entities in the data storage system 102 and so forth. As will be explained, the hierarchy of relationships between the resources 401 through 407 can be followed up or down by the resource traversal functions in order to identify resources that extend along the set of device or relationship path indicators 410. It is assumed for proper operation of embodiments that the repository 125 contains a collective set of managed objects 210 that properly represent the operational relationships as they currently exist between actual resources 401 through 407 within the storage area network environment 100. That is, the repository 125 contains a collective set of managed objects 210 that contain data and information about each related resource in the storage area network 100. For example, the managed objects 210 contain references such as pointers, inheritances, function calls, application programming interfaces (APIs) or other software mechanisms for one object to reference another thus defining or indicating an operational relationship 410 between the resources that correspond to those managed objects 210 in the repository 125. Accordingly, the resources 401 through 407 illustrated in FIG. 4 can equivalently be thought of as respective managed objects 210 that reference another managed object 210 as indicated by relationship indicators 410. In other words, the illustration in FIG. 4 is also suitable for use as a view of the managed objects 210 and their interrelationship amongst each other.

An example of a repository 125 to which techniques herein may be applied is the Enterprise Control Center (ECC) store repository maintained by EMC Corporation's ECC storage area network management software that includes a resource manager 120. ECC is a management application running on computer 110 for storage area network management and allows application of management actions such as deallocation of data storage space allocated on behalf of resources 401 through 407.

FIG. 5 is a diagram of a sample graphical user interface 550 generated by resource manager 120 for displaying relationships among a selected one or more resources and other related resources in a storage area network environment 133. As shown, graphical user interface 550 includes a first set of columns 512 and a second set of columns 510 for displaying resources in the hierarchy shown in FIG. 4. A first set of columns 512 includes column 526, column 527, and column 528 for displaying respective types of resources host devices 406, connectivity paths, and storage devices 407. A second set of columns 510 includes columns 520 through 525 for displaying additional types of resources in the hierarchy shown in FIG. 4. For example, column 520 displays an identifier of a host computer 104, column 521 displays data base instances, column 522 displays file systems, column 523 displays volume groups, column 524 displays logical volumes, and column 525 displays multi-path devices.

Note that groups of resources in columns of FIG. 5 are highlighted differently to indicate different information to a user 108. For example, resource manager 120 generating graphical user interface 550 "bolds" storage device 407-1 in storage device column 528 with highlighting to indicate that storage device 407-1 has been selected by user 108 for deallocation. Depending on the application, a user 108 can select a single resource or multiple resources for deallocation. In one application, a user 108 selects resources from a pop-up window and thereafter clicks on a "continue" icon to produce graphical user interface 550 and proceed with potentially deallocating resources.

File system resource 402-1, logical volume resource 404-1, and host device 406-1 represent a group of resources that will be completely or inherently deleted upon deallocation of storage device 407-1. These are highlighted as standard lines.

Database resource 401-1, volume group 403-1, and logical volume 404-2 represent a group of resources that will be impacted or partially deleted upon deallocation of selected resource storage device 407-1 because the resources rely on existence of sub-resources other than storage device 407-1 as in FIG. 4. These sub-resources also can be displayed and highlighted in graphical user interface 550. This group of resources is highlighted by dotted lines.

Resource manager 120 generates graphical user interface 550 based upon which resources in FIG. 4 have been selected by user 108 for deallocation. For example, based on the selection and traversal of managed objects 210 in repository 125, the resource manager 120 identifies resources in the hierarchy that are related to the selected resource which will be completely or partially impacted by applying a deallocation command. In the graphical user interface 550 shown in FIG. 5, the resource manager 120 performs an upward traversal to identify any resources that rely on use of storage device 407-1. For those resources identified during the upward traversal, the resource manager 120 identifies whether or not there are paths from such resources (e.g., sub-resources) to other resources in a downward traversal other than through the path used to initially identify the resource via the first upward traversal. If not, the resource manager 120 highlights the resources (e.g., file system 402-1, logical volume 404-1, and host device 406-1) as being completely affected by a deallocation of the selected resource. If so, the resource manager 120 highlights the resources (e.g., database 401-1, volume group 403-1, and logical volume 404-2) as being partially affected by a deallocation of the selected resource.

In one application, resource manager 120 displays sub-resources associated with a group of resources that are only partially impacted by deallocation of the originally selected resource. For example, in addition to displaying logical volume 404-2, resource manager 120 can display resources such as MPD 405-A, host device 406-3, host device 406-4, logical volume 404-4, logical volume 404-3, etc. as in FIG. 4. As discussed, this group of sub-resources would be appropriately highlighted so that a user 108 can identify this class of resources with respect to the other highlighted groups of resources.

Note that graphical user interface 550 includes path indicators 410 to show a relationship of a resource at one level to a resource at another level in the hierarchy. For example, indicator 410-3 identifies a path from host device 406-1 to storage device 407-1. In one application, the resource manager 120 does not provide a pictorial view of the indicators 410 in graphical user interface 550.

As another example, assume that the user 108 deallocates indicator path 410-3 instead of the storage device resource 407-1 in the hierarchy in FIG. 4. In this instance, the resource manager 120 would highlight path indicator 410-3 in graphical user interface 550 as the selected resource being deallocated. The resource manager 120 would also highlight the respective managed objects or resources (e.g., database 401-1, volume group 403-1, and logical volume 404-2) that will be partially deallocated from the storage area network environment as a first set of resources, each of which has at least one associated downstream resource path other than through the selected one or more resources to be deallocated to other sub-resources in the storage area network environment 133. Additionally, in one application, the resource manager 120 would highlight respective managed objects (e.g., file system 402-1, logical volume 404-1, and host device 406-1) that will be completely or inherently deallocated from the storage area network environment 133 as a second set of managed objects, each of which has downstream resource paths only through the selected one or more resources to be deallocated.

Note that a user 108 can select resources higher up in a hierarchy of FIG. 4 for potential deallocation. Related and earlier filed U.S. patent application Ser. No. 10/750,336 entitled "METHODS AND APPARATUS FOR APPLICATION OF MANAGEMENT ACTIONS TO RESOURCES SHARING RELATIONSHIPS," filed on Dec. 31, 2003, discusses techniques of identifying other resources in the are affected based on application of traversal functions such as "going down," "going up," and "closure." Techniques herein therefore include highlighting different sets of resources identified via the traversal functions to illustrate to user 108 of other resources in the storage area network environment that may be affected by deallocation of a resource higher up in the hierarchy of FIG. 4.

FIG. 6 is a diagram of a sample graphical user interface 650 for displaying relationships among resources in a storage area network environment 133. As shown, graphical user interface 650 includes columns 620-633 for displaying resources in the hierarchy shown in FIG. 4. For example, column 621 is reserved for identification of a host computer 104 in storage area network environment 133, column 621 is reserved for database resources 401, column 622 is reserved for file system resources 402, column 623 is reserved for volume group resources 403, column 624 is reserved for logical volume resources 404, column 625 is reserved for multi-path device resources 405, column 626 is reserved for host device resources 406, column 627 is reserved for HBA (Host Bus Adapter) resources, column 628 is reserved for port resources, column 629 is reserved for fabric resources, column 630 is reserved for port resources, column 631 is reserved for director resources, column 632 is reserved for storage array resources, column 633 is reserved for storage device resources 401, etc. In certain instances, one or more columns in graphical user interface 650 will not include any resources of a corresponding type if a traversal function initiated by resource manager 120 does not reveal any related resources (e.g., resources associated with a selected one or more resources to be deallocated) at a corresponding level of the hierarchy in FIG. 4.

In the example graphical user interface 650 in FIG. 6, user 108 has selected path 610 to be deallocated from storage area network environment 133. User 108 can toggle display regions 661 and 662 to select and deselect resources for deallocation. For example, a user 108 can click on display region 661 to select path 610 and associated resources for deallocation from the storage area network environment 133. A user 108 can click on display region 662 to select path 612 and associated resources for deallocation from the storage area network environment 133. User 108 may click again on display regions 661 and 662 to deselect a respective path from being deallocated. In one application, graphical user interface 650 includes a selectable display region in proximity to any or all of the displayed resources so that a user 108 can select any additional resources in a hierarchy to deallocate from storage area network environment 133.

During operation, resource manager 120 populates columns 626 through 633 with information identifying resources (e.g., resources discussed in FIG. 3) in storage area network environment 133 that are associated with paths 610 and 612. Accordingly, a user 108 can view what resources are associated with a given path to be deleted or a potential path (e.g., path 612) to be deleted. In one application, resource manager 120 enables a user 108 to perform a fine-grain selection of a resource such as a host device, a host bus adapter, a host port, a switch fabric, a fiber channel port, a director, a storage array, and a storage device for deallocation from the storage area network environment 133.

Similar to the graphical user interface 550 in FIG. 5, columns 620 through 625 in FIG. 6 display resources in the storage area network environment 133 related to the path selected for deallocation. In one application, resource manager 120 highlights resources that will be impacted but not inherently deleted if the selected resource were deallocated from the storage area network environment 133. For example, path 610 is selected for deallocation. Resource manager 120 initiates the up-down traversal function to identify that resource 605 in column 622 would be impacted if path 612 were deallocated from storage area network environment 133 but not inherently deleted as previously discussed. In other words, resource 605 corresponds to a managed object 210 that would only be partially deallocated. Shaded region 608 (e.g., pink shading) identifies the partial deallocation and that the integrity of the resource 605 and underlying object is at risk if the user proceeds with deallocation. The user may select other resources for deallocation. Upon selection of other resources for deallocation such as clicking on display region 662, the resource manager 120 re-computes which objects will be partially deallocated and updates graphical user interface 650 accordingly. Selection of path 612 would also cause resources in path 612 to be highlighted as well.

In certain circumstances, a column such as column 622 may include multiple identified partially deallocated objects. To bring partially deallocated objects in view, the user 108 can click on a heading of the column (such as column 622) to initiate a resorting by resource manager 120. Resorting causes all partially deallocated objects to be displayed toward the top of a column for simultaneous viewing by the user 108. This renders it easier for the user 108 to assess which resources are being partially deallocated and whether to proceed with deallocation. Thus, a user 108 can preview an affect of deallocation and abort a process of deallocating the selected one or more resources from the storage area network environment 133.

In one application, a user 108 may notify the resource manager 120 to proceed with deallocation of the selected one or more resources as well as other selected or related resources in the storage area network environment 133 so that all resources having a logical path through the initially selected one or more resources are deallocated from the storage area network environment 133.

Functionality supported by computer system 110 will now be discussed with respect to flowchart 700 in FIGS. 7 and 8. There will be some overlap as discussed above with respect to FIGS. 1 through 6.

Figure 7:
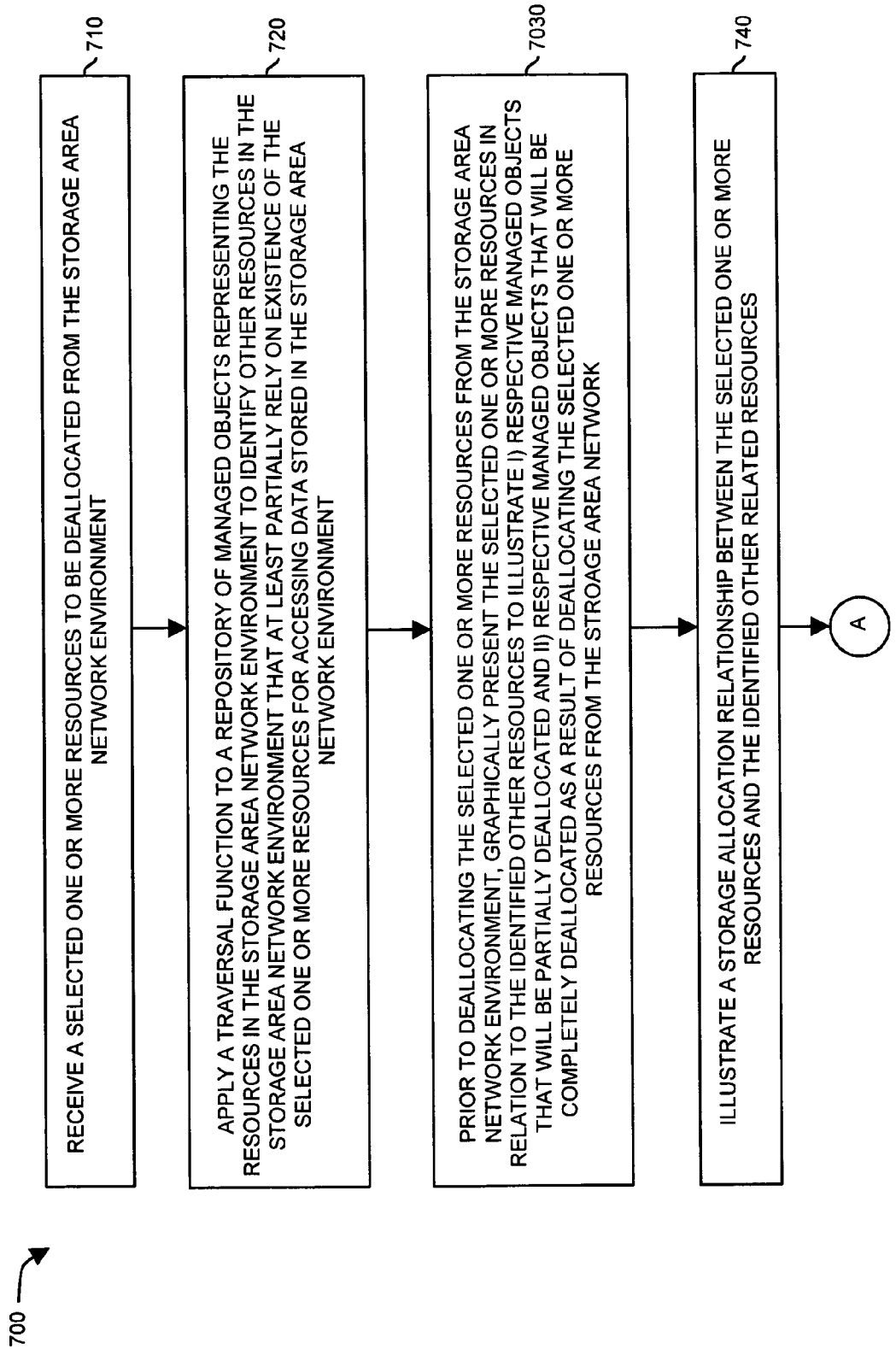
FIGS. 7 and 8 combine to form a flowchart illustrating a technique of displaying an interrelation of resources in a storage area network.
Figure 8:
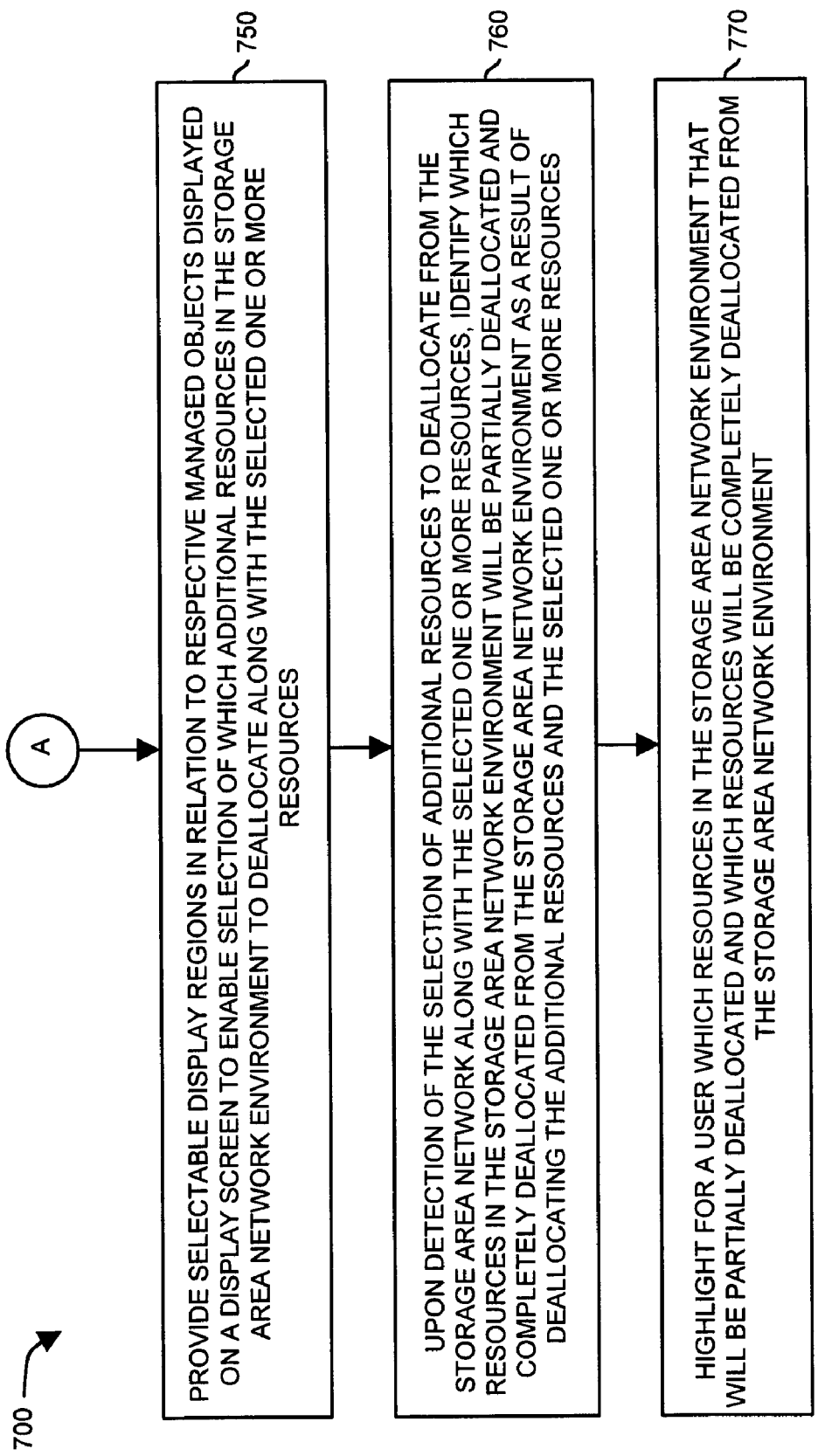

FIGS. 7 and 8 combine to form a flowchart 700 of processing steps performed by resource manager 120. In general, flowchart 700 illustrates how resource manager 120 enables user 108 of the management station computer system 110 to select resources and display a relationship of the selected resources with respect to other resources in a storage area network. Note that the discussion of FIGS. 7 and 8 will include occasional references to techniques and reference numerals discussed in the previous figures.

Referring to FIG. 7, in step 710, the resource manager 120 receives a selected one or more resources to be deallocated from the storage area network environment 133.

In step 720, the resource manager 120 applies a traversal function to a repository 125 of managed objects 210 representing the resources in the storage area network environment 133 to identify other resources in the storage area network environment 133 that at least partially rely on existence of the selected one or more resources for accessing data stored in the storage area network environment 133.

In step 730, prior to deallocating the selected one or more resources from the storage area network environment 133, in graphical user interface 550 or 650, the resource manager 120 graphically presents the selected one or more resources (e.g., storage device 407-1 as shown in FIG. 5) in relation to the identified other resources to illustrate i) respective managed objects 210 (e.g., respective resources) that will be partially deallocated and ii) respective managed objects 210 (e.g., respective resources) that will be completely deallocated as a result of deallocating the selected one or more resources from the storage area network. Accordingly, the resource manager 120 highlights the identified other resources in the storage area network environment 133 that would not be inherently deleted altogether from the storage area network environment 133 but whose ability to access data would at least be partially reduced if the selected one or more resources were deallocated from the storage area network environment 133. In other words, a user 108 may deallocate storage device resource 407-1. As a result, file system resource 402-1, logical volume 404-1, and host device 406-1 will inherently be deallocated. Database resource 401-1, volume group 403-1, and logical volume 404-2 will survive but will be affected because each of these resources partially utilizes (e.g., does not depend solely on) storage device resource 407-1 as a resource to store data.

In step 740, using graphical user interface 550 or 650, the resource manager 120 illustrates a storage allocation relationship between the selected one or more resources and the identified other related resources.

Referring now to FIG. 8, in step 750, the resource manager 120 provides selectable display regions (e.g., display regions 661, 662) in relation to respective managed objects 210 (e.g., resources) displayed in graphical user interface 550 of display screen 130 to enable selection of which additional resources in the storage area network environment 133 to deallocate along with the selected one or more resources. Thus, if a user 108 initially selects a resource that results in partial deallocation of other resources in the storage area network environment 133, the user 108 can further select (e.g., via clicking) other displayed resources in graphical user interface 650 so that there are no partially deleted resources in the storage area network environment 133.

In step 760, upon detection of the selection of additional resources to deallocate from the storage area network environment 133 along with the initially selected one or more resources, the resource manager 120 re-computes (based on another traversal of the managed objects 210) which resources in the storage area network environment 133 will be partially deallocated and completely deallocated from the storage area network environment 133 as a result of deallocating the additional resources and the selected one or more resources.

In step 770, the resource manager 120 highlights for a user 108 which resources in the storage area network environment 133 that will be partially deallocated and which resources will be completely deallocated from the storage area network environment 133.

Figure 9:
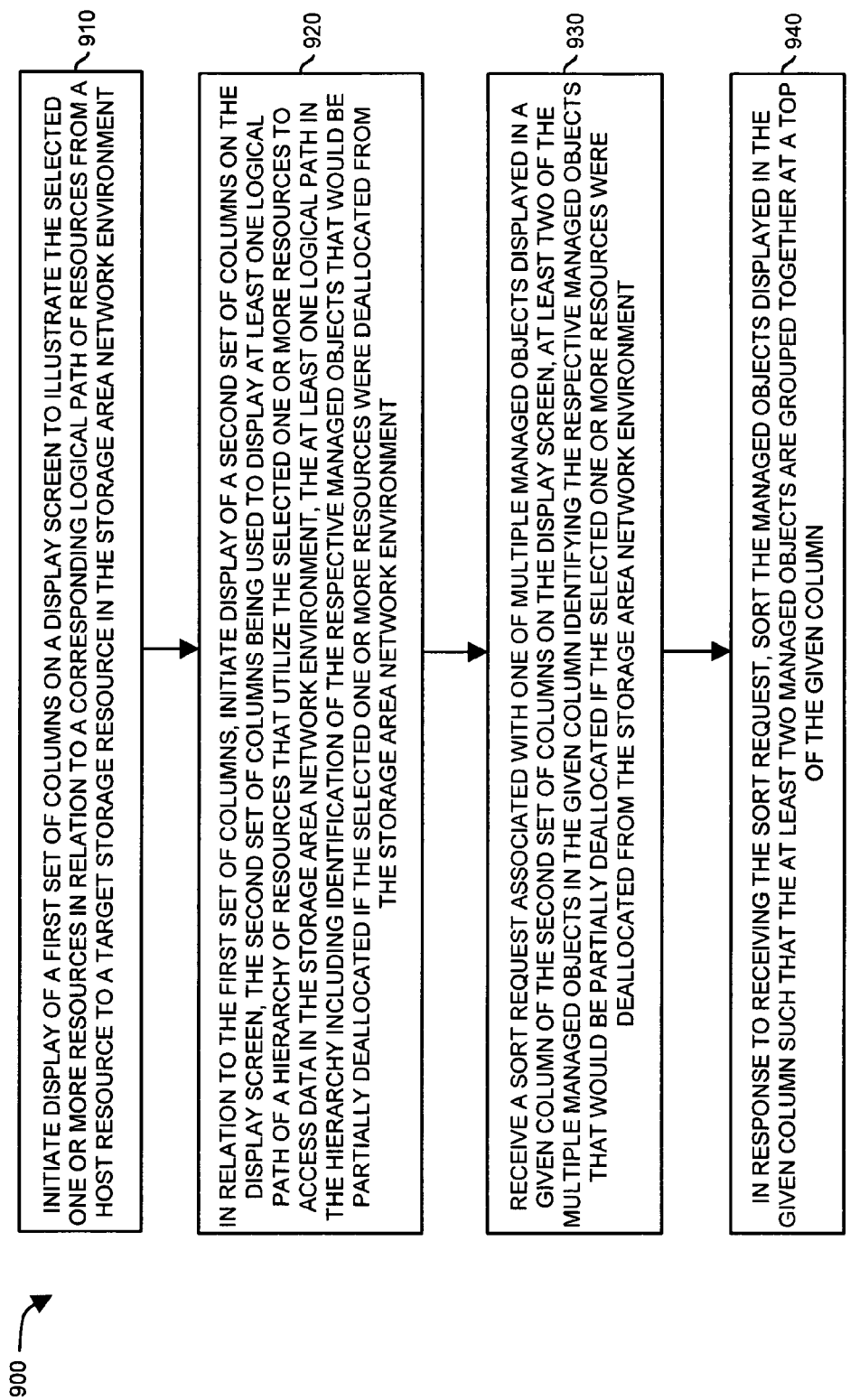
FIG. 9 is a flowchart illustrating a technique of displaying an interrelation of resources in a storage area network.

FIG. 9 is a flowchart 900 of processing steps performed by resource manager 120 to produce a graphical user interface 550, 650. In general, flowchart 900 illustrates how resource manager 120 facilitates deallocation of resources based upon generating a display of graphical user interface 550, 650 for user 108.

In step 910, the resource manager 120 initiates display of a first set of columns on a display screen to illustrate the selected one or more resources in relation to a corresponding logical path of resources from a host resource to a target storage resource in the storage area network environment 133.

In step 920, in relation to the first set of columns, initiate display of a second set of columns on the display screen, the second set of columns being used to display at least one logical path of a hierarchy of resources that utilize the selected one or more resources to access data in the storage area network environment 133, the at least one logical path in the hierarchy including identification of the respective managed objects 210 that would be partially deallocated if the selected one or more resources were deallocated from the storage area network environment 133.

In step 930, receive a sort request associated with one of multiple managed objects 210 (e.g., resources) displayed in a given column of the second set of columns on the display screen, at least two of the multiple managed objects in the given column identifying the respective managed objects that would be partially deallocated if the selected one or more resources were deallocated from the storage area network environment 133.

In step 940, in response to receiving the sort request, sort the managed objects 210 displayed in the given column such that the at least two managed objects or resources are grouped together at a top of the given column.

Figure 10:
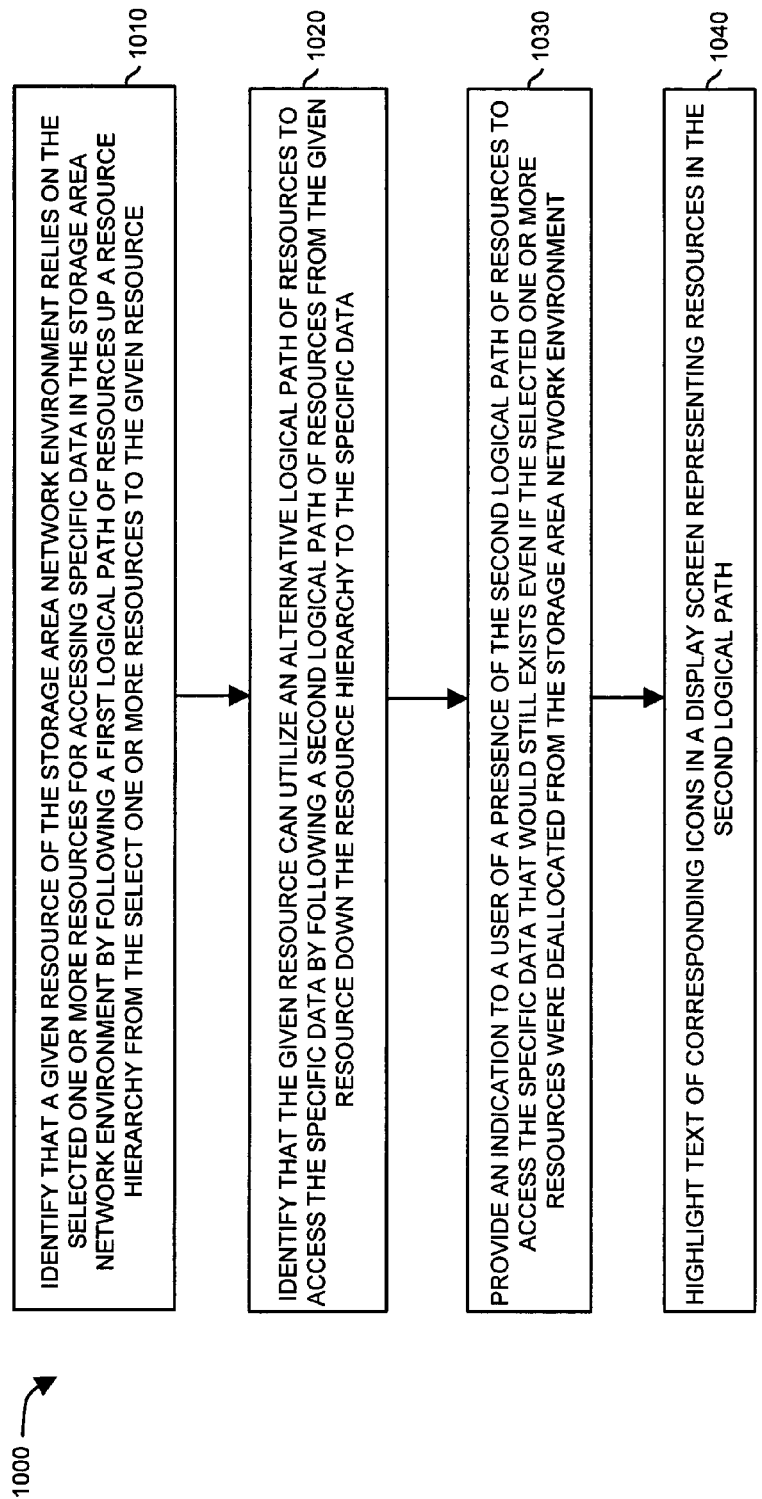
FIG. 10 is a flowchart illustrating a technique of displaying an interrelation of resources in a storage area network.

FIG. 10 is a flowchart 1000 of processing steps performed by resource manager 120 to produce a graphical user interface 550, 650 facilitating deallocation of resources in a storage area network environment 133.

In step 1010, the resource manager 120 identifies (e.g., based on use of an up-down traversal function) that a given resource of the storage area network environment 133 relies on the selected one or more resources for accessing specific data in the storage area network environment 133 by following a first logical path of resources up a resource hierarchy from a selected one or more resources to the given resource.

In step 1020, the resource manager 120 identifies that the given resource can utilize an alternative logical path of resources to access the specific data by following a second logical path of resources from the given resource down the resource hierarchy to the specific data.

In step 1030, the resource manager 120 provides an indication to a user 108 of a presence of the second logical path of resources to access the specific data that would still exist even if the selected one or more resources were deallocated from the storage area network environment 133.

In step 1040, the resource manager 120 highlights text (or a background of text, etc.) of corresponding icons (e.g., symbols in the columns identifying resources) in a display screen representing resources in the second logical path.

Techniques described herein are well suited for use in applications in which a network manager manages allocation and deallocation of resources in a SAN environment. For example, a graphical user interface 150 of the present application can provide three specific things about a managed object such as i) that an object will be fully deallocated, ii) that an object will be partially deallocated (and hence will be corrupted), and iii) that an object will lose some of its paths but not all of them (and will suffer reliability or performance when accessed) if a user actually goes through with deallocation of the selected set of resources. It may be useful to note that case (i) is actually a special circumstance of case (iii) in which an object loses *all* its paths. In other words, an object that loses all its paths is considered to be or will be fully deallocated. It should be noted that embodiments herein are not limited to uses discussed herein but can be applied to other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method in which at least one computer system initiates execution of instructions retrieved from storage, the computer-implemented method facilitating de-allocation of resources in a storage area network environment, the computer-implemented method comprising:

receiving, at the at least one computer, a selected at least one resource to be deallocated from the storage area network environment;

applying a traversal function to a repository of managed objects representing the resources in the storage area network environment to identify other resources in the storage area network environment that at least partially rely on existence of the selected at least one resource for accessing data stored in the storage area network environment;

prior to deallocating the selected at least one resource from the storage area network environment, graphically presenting the selected at least one resource in relation to the identified other resources to illustrate i) respective managed objects that will be partially deallocated and ii) respective managed objects that will be completely deallocated as a result of deallocating the selected at least one resource; and wherein applying the traversal function to the repository of managed objects results in identifying logical paths of related resources in a resource hierarchy that depend on the selected at least one resource to access data in the storage area network environment.

2. A computer-implemented method as in claim 1, wherein graphically presenting the selected at least one resource in relation to the identified other resources includes highlighting the identified other resources in the storage area network environment that would not be inherently deleted altogether but whose ability to access data would at least be partially reduced if the selected at least one resource were deallocated from the storage area network environment.

3. A computer-implemented method as in claim 1, further comprising:
    displaying the logical paths of related resources as adjacent columns of different types of resources, each of the logical paths including a resource from each of at least two of the adjacent columns.

4. A computer-implemented method as in claim 3, wherein a given column of the adjacent columns of resources is empty because no resource of a corresponding type associated with the given column exists for the logical paths.

5. A computer-implemented method as in claim 1, wherein graphically presenting the selected at least one resource in relation to the identified other resources includes illustrating a storage allocation relationship between the selected at least one resource and the identified other resources.

6. A computer-implemented method as in claim 1, wherein the selected at least one resource is at least one of: a host device, a host bus adapter, a host port, a switch fabric, a fiber channel port, a director, a storage array, and a storage device in the storage area network environment.

7. A computer-implemented method as in claim 1, wherein graphically presenting the selected at least one resource in relation to the identified other resources includes:
    providing selectable display regions in relation to respective managed objects displayed on a display screen to enable selection of which additional resources in the storage area network environment to deallocate along with the selected at least one resource.

8. A computer-implemented method as in claim 7 further comprising:
    upon detection of the selection of additional resources to deallocate from the storage area network along with the selected at least one resource, identifying which resources in the storage area network environment will be partially deallocated and completely deallocated from the storage area network environment as a result of deallocating the additional resources and the selected at least one resource; and
    highlighting for a user which resources in the storage area network environment that will be partially deallocated and which resources will be completely deallocated from the storage area network environment.

9. A computer-implemented method as in claim 1 further comprising:
    receiving an indication from a user to abort a process of deallocating the selected at least one resource from the storage area network environment.

10. A computer-implemented method as in claim 1 further comprising:
    receiving an indication from a user to proceed with deallocation of the selected at least one resource as well as other related resources in the storage area network environment so that all resources having a logical path through the selected at least one resource are deallocated from the storage area network environment.

11. A computer-implemented method as in claim 1, wherein graphically presenting the selected at least one resource in relation to the identified other resources includes:
    initiating display of a first set of columns on a display screen to illustrate the selected at least one resource in relation to a corresponding logical path of resources from a host resource to a target storage resource in the storage area network environment.

12. A computer-implemented method as in claim 11, wherein graphically presenting the selected at least one resource in relation to the identified other resources includes:
    in relation to the first set of columns, initiating display of a second set of columns on the display screen, the second set of columns being used to display at least one logical path of a hierarchy of resources that utilize the selected at least one resource to access data in the storage area network environment, the at least one logical path in the hierarchy including identification of the respective managed objects that would be partially deallocated if the selected at least one resource were deallocated from the storage area network environment.

13. A computer-implemented method as in claim 12 further comprising:
    receiving a sort request associated with one of multiple managed objects displayed in a given column of the second set of columns on the display screen, at least two of the multiple managed objects in the given column identifying the respective managed objects that would be partially deallocated if the selected at least one resource were deallocated from the storage area network environment; and
    in response to receiving the sort request, sorting the managed objects displayed in the given column such that the at least two managed objects are grouped together at a top of the given column.

14. A computer-implemented method as in claim 1, wherein graphically presenting the selected at least one resource in relation to the identified other resources includes highlighting the selected at least one resource with a first color and highlighting the identified related resources with a second color to differentiate which resources were requested to be deallocated and which resources, other than the selected at least one resources, will be corrupted after completing deallocation of the selected at least one resource.

15. A computer-implemented method as in claim 1 further comprising:
    identifying that a given resource of the storage area network environment relies on the selected at least one resource for accessing specific data in the storage area network environment by following a first logical path of resources up the resource hierarchy from the selected at least one resource to the given resource;
    identifying that the given resource can utilize an alternative logical path of resources to access the specific data by following a second logical path of resources from the given resource down the resource hierarchy to the specific data; and
    providing an indication to a user of an existence of the second logical path of resources to access the specific data if the selected at least one resource were deallocated from the storage area network environment.

16. A computer-implemented method as in claim 15, wherein providing the indication includes highlighting text of corresponding icons in a display screen representing resources in the second logical path.

17. A computer-implemented method as in claim 1, wherein i) the respective managed objects that will be partially deallocated from the storage area network environment is a first set of managed objects, each of which has at least one associated downstream resource path other than through the selected at least one resource to data in the storage area network environment, and ii) the respective managed objects that will be completely deallocated from the storage area network environment is a second set of managed objects in the resource hierarchy that have downstream resource paths only through the selected at least one resource to data in the storage area network environment.

18. A computer-implemented method as in claim 1, further comprising:
   identifying that the respective managed object that will be completely deallocated will be deallocated as a result of losing all its paths to other resources.

19. A computer-implemented method as in claim 1, wherein the selected at least one resource being deallocated is a file path for accessing stored data associated with the storage area network;
   wherein the respective managed objects that will be partially deallocated includes a first resource that requires use of the file path for accessing the stored data in the storage area network; and
   wherein the respective managed objects that will be partially deallocated includes a second resource, the second resource utilizing the file path and at least one additional file path that is not being deallocated to access data associated with the storage area network.

20. A computer-implemented method as in claim 1, wherein receiving the selected at least one resource includes receiving an identity of a particular storage resource being deleted from the storage area network environment; and
   wherein applying the traversal function results in: i) identifying a first resource that solely depends on the particular storage resource for storing of data associated with the first resource, and ii) identifying a second resource that partially depends on the particular storage resource for storing of data associated with the second resource, the second resource depending on the particular resource and at least one other resource for storing of data associated with the second resource.

21. A computer-implemented method as in claim 20 further comprising:
   generating a first visual indication that the first resource completely depends on the particular storage resource for storage of the data associated with the first storage resource; and
   generating a second visual indication that the second resource is at risk if the particular storage resource is removed from the storage area network environment because the second resource at least partially depends on the particular storage resource for storage.

22. A computer-implemented method as in claim 21 further comprising:
   receiving a command to resort a column including the second resource, the second visual indication indicating that the second resource is at risk; and
   in response to receiving the command, resorting a column of multiple resources at risk to display the second resource for viewing along with at least one other resource at risk.

23. A computer-implemented method as in claim 1 further comprising:
   displaying the selected at least one resource as a file path in a first portion of a display screen; and
   wherein graphically presenting the selected at least one resource in relation to the identified other resources includes: displaying the identified other resources in a second portion of the display screen, the second portion being separate than the first portion such that the identified other resources are not part of the file path but are resources that depend on use of the file path to manage storage of data in the selected at least one resource.

24. A computer system associated with a storage area network, the computer system comprising:
   a processor;
   a memory unit that stores instructions associated with an application executed by the processor; and
   an interconnect coupling the processor and the memory unit, enabling the computer system to execute the application and perform operations of:
   receiving a selected at least one resource to be deallocated from the storage area network environment;
   applying a traversal function to a repository of managed objects representing the resources in the storage area network environment to identify other resources in the storage area network environment that at least partially rely on existence of the selected at least one resource for accessing data stored in the storage area network environment;
   prior to deallocating the selected at least one resource from the storage area network environment, graphically presenting the selected at least one resource in relation to the identified other resources to illustrate i) respective managed objects that will be partially deallocated and ii) respective managed objects that will be completely deallocated as a result of deallocating the selected at least one resource; and
   wherein applying the traversal function to the repository of managed objects results in identifying logical paths of related resources in a resource hierarchy that depend on the selected at least one resource to access data in the storage area network environment.

25. A computer system as in claim 24, further supporting operations of:
   displaying the logical paths of related resources as adjacent columns of different types of resources, each of the logical paths including a resource from each of at least two of the adjacent columns.

26. A computer system as in claim 24, wherein graphically presenting the selected at least one resource in relation to the identified other resources includes illustrating a storage allocation relationship between the selected at least one resource and the identified other resources.

27. A computer system as in claim 24, wherein graphically presenting the selected at least one resource in relation to the identified other resources includes:
   providing selectable display regions in relation to respective managed objects displayed on a display screen to enable selection of which additional resources in the storage area network environment to deallocate along with the selected at least one resource.

28. A computer system as in claim 27 further supporting operations of:
   upon detection of the selection of additional resources to deallocate from the storage area network along with the selected at least one resource, identifying which resources in the storage area network environment will be partially deallocated and completely deallocated from the storage area network environment as a result of deallocating the additional resources and the selected at least one resource; and
   highlighting for a user which resources in the storage area network environment that will be partially deallocated and which resources will be completely deallocated from the storage area network environment.

29. A computer system as in claim 24 further supporting operations of:
   receiving an indication from a user to proceed with deallocation of the selected at least one resource as well as other related resources in the storage area network environment so that all resources having a logical path through the selected at least one resource are deallocated from the storage area network environment.

30. A computer system as in claim 24, wherein graphically presenting the selected at least one resource in relation to the identified other resources includes:
   initiating display of a first set of columns on a display screen to illustrate the selected at least one resource in relation to a corresponding logical path of resources from a host resource to a target storage resource in the storage area network environment.

31. A computer system as in claim 30, wherein graphically presenting the selected at least one resource in relation to the identified other resources includes:
   in relation to the first set of columns, initiating display of a second set of columns on the display screen, the second set of columns being used to display at least one logical path of a hierarchy of resources that utilize the selected at least one resource to access data in the storage area network environment, the at least one logical path in the hierarchy including identification of the respective managed objects that would be partially deallocated if the selected at least one resource were deallocated from the storage area network environment.

32. A computer system as in claim 31 further supporting operations of:
   receiving a sort request associated with one of multiple managed objects displayed in a given column of the second set of columns on the display screen, at least two of the multiple managed objects in the given column identifying the respective managed objects that would be partially deallocated if the selected at least one resource were deallocated from the storage area network environment; and
   in response to receiving the sort request, sorting the managed objects displayed in the given column such that the at least two managed objects are grouped together at a top of the given column.

33. A computer system as in claim 24 further supporting operations of:
   identifying that a given resource of the storage area network environment relies on the selected at least one resource for accessing specific data in the storage area network environment by following a first logical path of resources up a resource hierarchy from the select at least one resource to the given resource;
   identifying that the given resource can utilize an alternative logical path of resources to access the specific data by following a second logical path of resources from the given resource down the resource hierarchy to the specific data; and
   providing an indication to a user of an existence of the second logical path of resources to access the specific data if the selected at least one resource were deallocated from the storage area network environment.

34. A computer system as in claim 33, wherein providing the indication includes highlighting text of corresponding icons in a display screen representing resources in the second logical path.

35. A computer system as in claim 24, wherein i) the respective managed objects that will be partially deallocated from the storage area network environment is a first set of managed objects, each of which has at least one associated downstream resource path other than through the selected at least one resource to data in the storage area network environment, and ii) the respective managed objects that will be completely deallocated from the storage area network environment is a second set of managed objects in the resource hierarchy that have downstream resource paths only through the selected at least one resource to data in the storage area network environment.

36. A computer program product including a computer-readable storage medium having instructions stored thereon for processing data information, such that the instructions, when carried out by a processing device, enable the processing device to perform the steps of:
   receiving a selected at least one resource to be deallocated from the storage area network environment;
   applying a traversal function to a repository of managed objects representing the resources in the storage area network environment to identify other resources in the storage area network environment that at least partially rely on existence of the selected at least one resource for accessing data stored in the storage area network environment;
   prior to deallocating the selected at least one resource from the storage area network environment, graphically presenting the selected at least one resource in relation to the identified other resources to illustrate i) respective managed objects that will be partially deallocated and ii) respective managed objects that will be completely deallocated as a result of deallocating the selected at least one resource; and
   wherein applying the traversal function to the repository of managed objects results in identifying logical paths of related resources in a resource hierarchy that depend on the selected at least one resource to access data in the storage area network environment.

37. A computer system associated with a storage area network, the computer system providing:
   receiving a selected at least one resource to be deallocated from the storage area network environment;
   applying a traversal function to a repository of managed objects representing the resources in the storage area network environment to identify other resources in the storage area network environment that at least partially rely on existence of the selected at least one resource for accessing data stored in the storage area network environment;
   prior to deallocating the selected at least one resource from the storage area network environment, graphically presenting the selected at least one resource in relation to the identified other resources to illustrate i) respective managed objects that will be partially deallocated and ii) respective managed objects that will be completely deallocated as a result of deallocating the selected at least one resource; and
   wherein applying the traversal function to the repository of managed objects results in identifying logical paths of related resources in a resource hierarchy that depend on the selected at least one resource to access data in the storage area network environment.

* * * * *